July 7, 1931.  F. A. HART  1,812,873
COMPUTING MACHINE
Filed Dec. 31, 1926  2 Sheets-Sheet 1
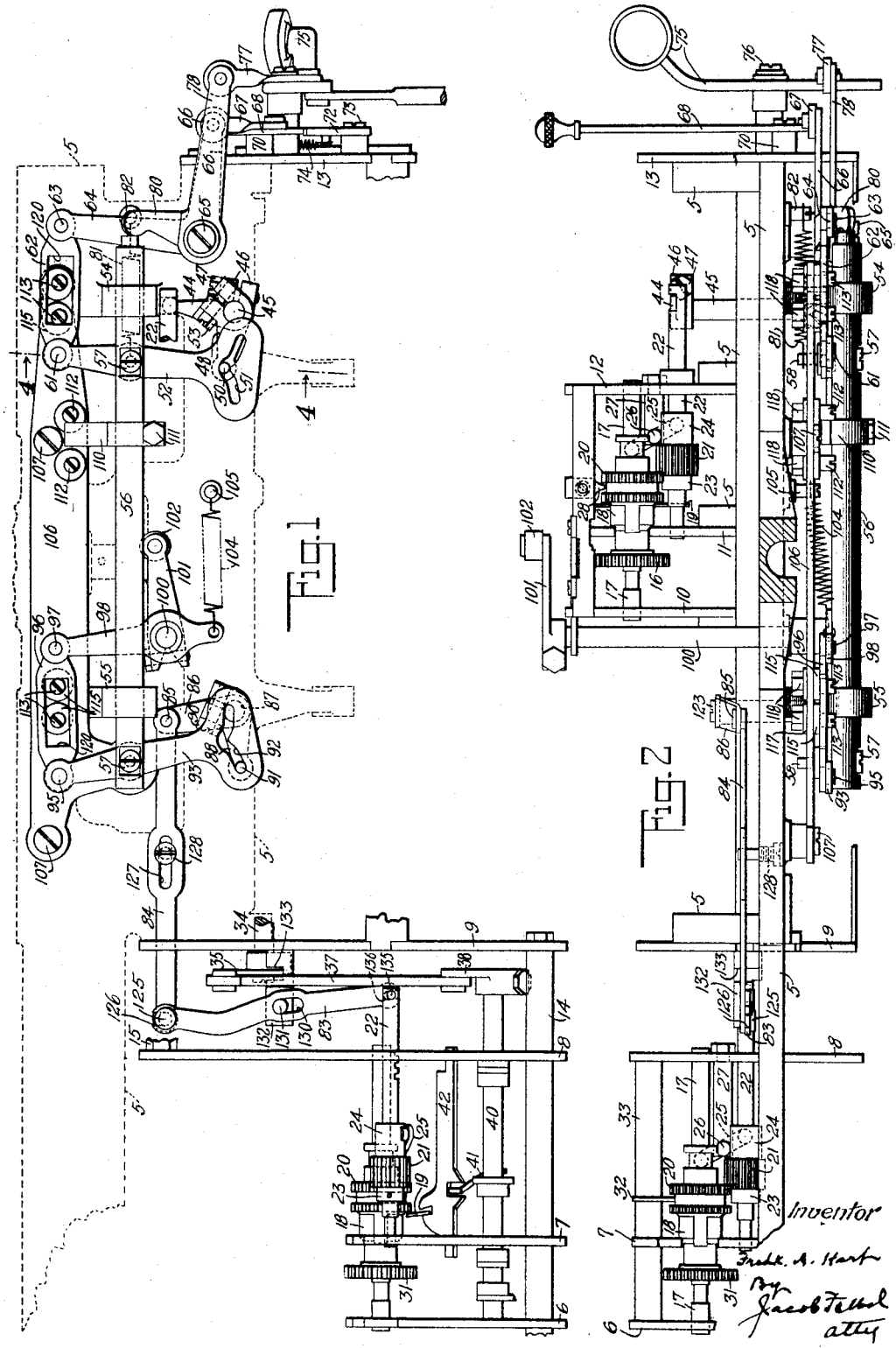

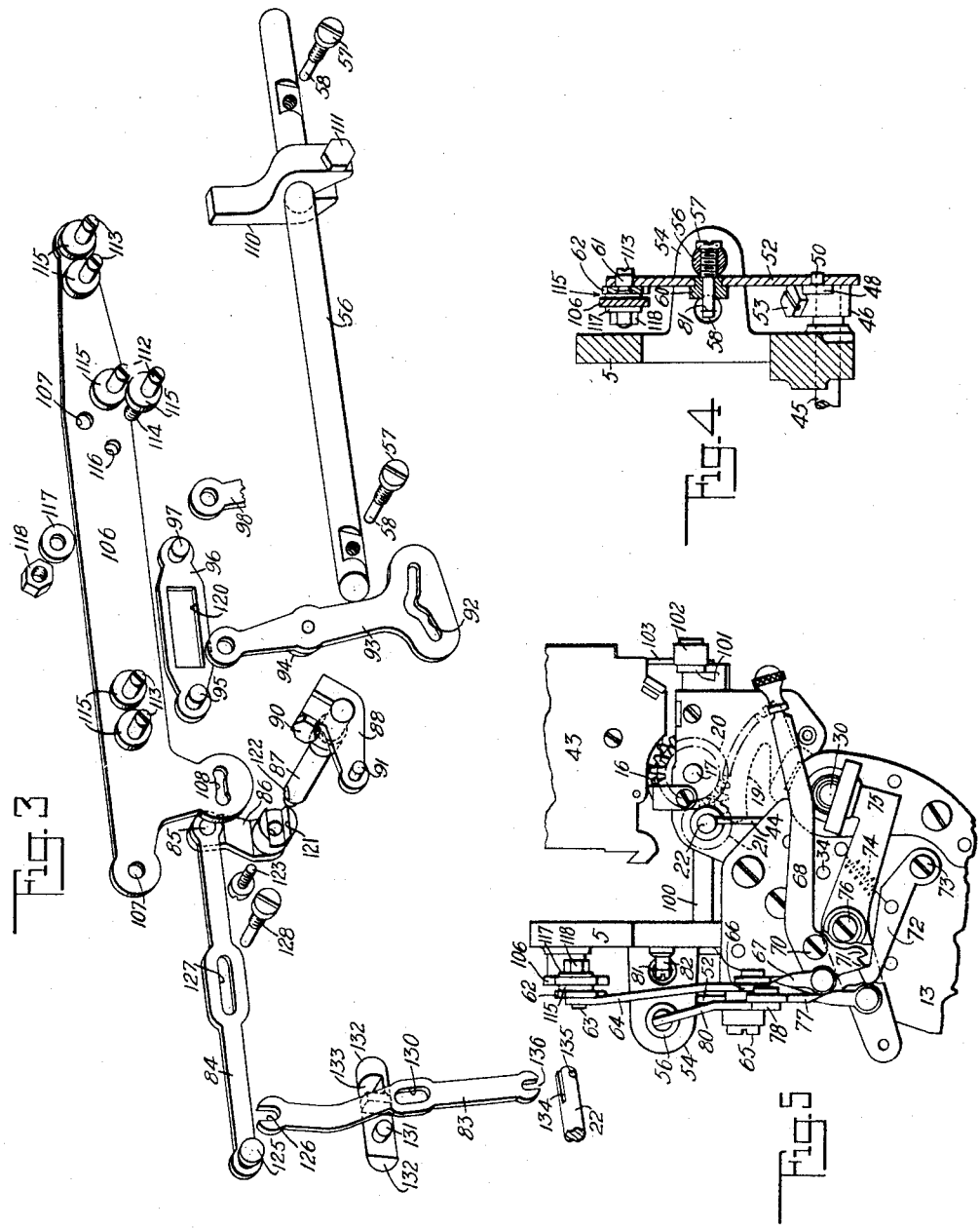

Patented July 7, 1931

1,812,873

UNITED STATES PATENT OFFICE

FREDERICK A. HART, OF NEW BRITAIN, CONNECTICUT, ASSIGNOR TO REMINGTON TYPEWRITER COMPANY, OF ILION, NEW YORK, A CORPORATION OF NEW YORK

COMPUTING MACHINE

Application filed December 31, 1926. Serial No. 158,266.

My invention relates to computing machines and it has for its principal object to make certain improvements in the mechanism for shifting the gears for add, subtract and disconnect in cross footing combined typewriting and computing machines. The invention is shown applied to a machine of the character specified which has for a number of years been sold by the Remington Typewriter Company.

To the above and other ends, my invention consists in certain features of construction and combinations and arrangements of parts, all of which will be fully set forth herein and particularly pointed out in the claims.

One form of Remington cross-footing machine is shown in the patent to J. C. Wahl No. 1,270,471, dated June 25, 1918. Said machine includes a vertical master wheel and a cross master wheel, each reversible for addition and subtraction and each capable of being set for "disconnect". The patented mechanism for controlling the cross master wheel includes a hand lever at the right-hand end of the actuator and also a follower roller at the middle of the machine in the plane of the vertical master wheel and controlled by cams on vertical totalizers. The mechanism also includes a handle numbered 338 in the patent, which handle when moved to its lower position renders the automatic mechanism, viz., the cams and follower roller, operative to control the cross master wheel, and when the handle is in its upper position it renders the hand operated lever effective to control the cross master wheel. The machine was for some time manufactured as above described, but of late years the manual handle for reversing the cross master wheel, and also the handle 338 for determining whether the cross master wheel shall be controlled automatically or by hand, have both been omitted from the machine together with the connected devices, and the gear shift for the cross master wheel has been controlled solely by the cams and follower roller and a "correction" or reversing key. With the exception just noted, and except for some minor changes the gear shift mechanism as at present manufactured is in general substantially like that described in Patent No. 1,270,471; and it is this now manufactured mechanism that it is the purpose of the present invention to improve.

In Patent No. 1,270,471, the vertical master wheel has its change gear mechanism under the control of a handle numbered in the patent 336. In said patent there is also shown a handle numbered 339 which, when operated, reverses the state of both master wheels. The machine as at present manufactured includes levers having substantially the same functions as those shown in the patent just above referred to, but said levers modified as may be understood by reference to the patents to Hart Nos. 1,583,290, dated Sept. 12, 1924; and 1,587,304, dated June 1, 1926. The devices shown in these two Hart patents are substantially embodied in the Remington machine as now manufactured and are retained in the improved machine shown in the present application.

The present improvements are not designed to make any substantial change in the principle or mode of operation of the mechanism but are rather in the nature of mechanical improvements designed to facilitate the manufacture, assembly, disassembly, repair and adjustment of the machine; to make the parts accessible; and in some instances to make it of sturdier and better construction.

In the accompanying drawings only so much of the mechanism is shown as is necessary to an understanding of the present invention, it being understood that the parts not shown may be of any suitable construction and in particular that they may be, if desired, and preferably are, of the construction of the Remington machine now manufactured and well known in the art.

Figure 1 is a rear elevation.

Figure 2 is a plan view.

Figure 3 is an isometric view of the greater part of the new mechanism disassembled so as to show the shape of the various pieces and their general relation to one another.

Figure 4 is a front-to-rear vertical section on the line 4—4 of Figure 1.

Figure 5 is a left-hand end view.

The main frame piece of the computing mechanism of the Remington machine consists of a casting 5, part of which in Fig. 1 is outlined in dotted lines, this casting being secured by two screws to the top plate of a Remington typewriter. Most of the key actuated parts of the computer are supported by certain vertical frame plates secured to the main casting 5, eight of these plates being shown in the drawings and lettered respectively 6, 7, 8, 9, 10, 11, 12 and 13. Plates 9 and 13 may be regarded respectively as the right-hand and left-hand end plates of the vertical actuator, and plate 8 as the left-hand end plate of the cross actuator. Plate 8 is connected with plate 9 by posts 14, 15. The right-hand frame plate of the cross actuator is not shown in the drawings which in Figs. 1 and 2 is broken away.

The main or vertical master wheel 16 is fast on a shaft 17 which at its ends is journaled in plates 10 and 12. Said master wheel has a spline connection with the hub of a drive pinion 20 mounted on the shaft 17 with freedom to slide right and left. The pinion 20 meshes with a reverse pinion 21 which is loose on a slide shaft 22 so as to turn on said shaft but which is prevented from moving endwise relative to the shaft by fixed collars 23 and 24. The latter is connected with the hub of pinion 20 by means of a lever 25 of the first order, pivoted at 26 to a post 27 secured to the frame plate 12, said lever 25 having an upwardly projecting pin at each of its ends, one of said pins engaging with the fixed collar 24 on the shaft 22 and the other engaging in an annular groove in the hub of the pinion 20. The construction is such that if the shaft 22 be moved endwise carrying the pinion 21 with it, the pinion 20 will be slid in the opposite direction endwise of the shaft 17. This is the well-known change gear or reversing mechanism of the Remington machine. Said machine includes a driving segment 19 to which differential motion is imparted by the several numeral keys of the typewriter and which segment, during the down stroke of a key, swings in a plane coincident with that of the part of the pinion 20 nearest to the master wheel, as shown in Fig. 2. If the shaft 22 be pushed a short distance to the left in Fig. 2 (towards the operator's right), pinion 20 will be drawn a short distance toward the right in Fig 2 and neither pinion 20 nor 21 will be engaged by the segment. This is the disconnect position. If shaft 22 be pushed to its extreme position leftward in Fig. 2, the left-hand part of pinion 21 will move into the plane which in that figure is occupied by the left-hand part of pinion 20. In this subtract position of the parts the segment will engage pinion 21 and not pinion 20 and will therefore rotate the master wheel in reverse or subtract direction.

The pinion 20 is shown in the drawings with an annular groove turned in its periphery, cutting all of the teeth of the pinion in two so that the pinion appears to have a right-hand half and a left-hand half with the groove in between. In the drawings a stationary tongue or lug 28 projects into this groove. When pinion 20 is shifted slightly toward the right in Fig. 2 to the disconnect position, the left-hand section of the teeth of said pinion come into engagement with the lug 28, and the pinion is thereby locked positively in its proper fixed position against rotation. When the parts are set for subtract, the pinion 20 moves further toward the right and free of this locking lug 28. The segment 19 is mounted on a differential shaft 30, Fig. 5. In Fig. 2 it is indicated by dotted lines in the position it occupies during the down stroke of a key, its normal position being slightly to the left thereof, as viewed in said figure.

The cross master wheel is marked 31 in the drawings but for convenience its co-operating parts are designated by the same numerals as those of the main master wheel 16. The locking lug for the cross drive pinion 20 is made of a somewhat different form from that of the lug 28, consisting as it does of a projection from a vertical plate 32 mounted on the usual frame rods 33 of the cross actuator.

The mechanism includes a universal bar shaft 34 one end of which is shown in Fig. 1 and which carries an arm 35 connected by a link 37 with an arm 38 on a universal rock shaft 40 in the cross actuator. Among the functions of these rock shafts 34 and 40 is that of vibrating the segments 19 into and out of mesh with the drive pinions. The means for this purpose in the cross actuator is shown in Fig. 1, consisting of a sort of cam 41 mounted on the shaft 40 and controlling a slide bar 42 in a notch in the upper part of which the segment 19 engages.

The position of a vertical totalizer 43 is indicated in Fig. 5.

The means for shifting the upper rod or shaft 22 lengthwise to shift the gears, comprises an upright arm 44 rigidly mounted on the forward end of a rock shaft 45 journaled in the main casting 5 in the same manner as heretofore. As here shown this arm 44 is made with a split hub 46 and a tightening screw 47 whereby the arm may be very securely and readily fastened to the shaft in any adjusted relation. I have simplified the connection of this arm with the shaft 22. The latter is made with a transverse slot milled about half-way through the round shaft so that the flat bottom wall of the slot is substantially in a diametric plane of the shaft. The upper end of the arm 44 is rounded as shown in Fig. 1 and simply lies in said slot with its rear face in contact with the bottom wall of the slot and its rounded edges engaging the right and left end walls of the slot. This rounded end serves as a sort of pivotal connection between the arm and the shaft 22, and at the same time it prevents said shaft from turning in its bearings due to the contact of the flat face of the arm with the flat bottom of the slot in the shaft. It will be perceived that the construction is one that is extremely simple to manufacture and that it is assembled and everything brought into its proper place by the mere act of putting the arm on the shaft, this act of itself bringing the shaft into its proper position with respect to rotation.

The shaft 45 is itself controlled on the same principle as heretofore; that is to say, it has fast on its rear end a horizontal arm 48 from the free end of which a pin 50 projects into an inverted V-shaped slot 51 in the lower end of a sort of floating lever 52. This arm 48 also I have made with a split hub secured in position by a clamping screw 53. This construction lends itself readily to assembly and disassembly of parts and to easy and accurate adjustment thereof. In Fig. 1 the pin 50 is shown in the apex of the inverted V of the slot 51 with the result of setting the gear for addition as heretofore. Any movement of the lever 52 in either direction from this position to the full extent of the movement of said lever would bring the pin 50 into one or the other of the ends of the slot 51, which would set the vertical master wheel for subtraction. If the lever 52 were moved in either direction about half as far as just mentioned, the pin 50 and the parts connected therewith would be moved about half as far as before, and the mechanism of the main master wheel would be set for disconnect.

In the machine as heretofore constructed a lever similar to the lever 52 was supported at its upper end by means of a pin which passed through a horizontal guide slot in a stationary flat plate, and means were connected with a handle for moving said pin right and left and thereby controlling the position of the upper end of the lever. The up and down position of the lever was controlled by the guide slots referred to. In the present instance I have modified the means for controlling this lever as follows: I have made the casting 5 with two rearwardly projecting lugs 54 and 55, and have mounted in said lugs a slide rod or shifter bar 56. This is here shown as a round rod and at two points in its length it is flattened on one side, and a screw 57 is threaded through said rod at each of said flattened places, each of said screws being made at its free end with a reduced portion 58 which projects forward from the rod 56 and constitutes a stud. One of these studs projects through the hub 60 of the lever 52 as shown in Fig. 4 and supports said lever vertically and at the same time constitutes a pivot for the middle part of the lever. This bar 56 replaces a double sheet metal bar formerly employed in the machine but which did not support the cam lever 52 vertically.

In order to control the upper end of the lever 52 a stud 61 serves to pivot said end of said lever to a horizontal link 62, which at 63 is pivoted to the upstanding arm 64 of a bell crank whose hub is pivoted on a pivot screw 65 projecting from the main casting 5. The horizontal arm 66 of said bell crank is connected by a link 67 with the rear arm of a lever 68 which is pivoted at 70 to the outside face of the end plate 13 of the actuator. This lever 68 projects forward through a suitable slot in the casing (not shown) and it is designed to control the gear shift of the main master wheel which is set for addition when this lever is in its highest position, for subtraction in its lowest position and for disconnect in the middle position of the lever. Said lever is formed with two teeth 71 with which it engages a pointed tooth on a detent lever 72 pivoted at 73 and controlled by a spring 74.

Also pivoted to the frame plate 13 is the general reversing or correction key 75, this being a lever of the first order pivoted at 76 and connected by a link 77 with one arm 78 of a second bell crank also pivoted on the screw 65 and having an upright arm 80 adapted to press against the end of the shifter bar 56 to move the same leftward as viewed in Figs. 1 and 2 (rightward as viewed by the operator). Said shifter bar is returned to normal position by a spring 81 connected at one end to the pin 58 and at the other to a stationary pin 82, this spring passing through a hole made for the purpose in the lug 54 as shown in Fig. 4.

In the cross actuator the sliding shaft 22 for the subtract pinion projects through the frame plate 8 and is pivoted to a vertical lever 83 of the first order which at its upper end is pivoted to a link 84 pivoted at 85 to an arm 86 fastened on the forward end of a rock shaft 87 which shaft is journaled as heretofore in the main casting 5. At its rear end said shaft carries an arm 88 having a split hub and secured by a clamp screw 90. This arm 88 has a pin 91 projecting into a slot 92 of inverted V-shape in the lower end of a floating lever 93 which lever is in all respects like the lever 52 before referred to. Its hub 94, Fig. 3, is pivoted on one of the studs 58 and its upper end is pivoted at 95 to a link 96 which at 97 is pivoted to the upper end of a lever arm 98 rigidly mounted on a front-to-rear rock shaft 100 which is journaled in the main casting 5 as heretofore. In its forward end the shaft 100 has a horizontal arm 101 bearing a follower roller 102 which is adapted to be controlled by cam plates 103, Fig. 5, on the vertical totalizer 43. The roller is adapted to be depressed by said cams and it is normally held in its elevated position by means of a spring 104 connected to a depending arm of the lever 98 and to a stationary pin 105.

The cams 103 are the same as heretofore employed. When the follower roller 102 is in its highest position and the bar 56 is in its normal position, as shown in the drawings, the cross master wheel 31 is set for addition. When this roller is slightly depressed by a cam 103 said cross master wheel is set for disconnect, and when the roller is moved in its lowest position by a cam 103, the cross footer is set for subtraction all in the same manner as heretofore. If, however, the correction key 75 be depressed, pushing the bar 56 toward the left in Fig. 1 (towards the operator's right), then the setting for the cross master wheel will be reversed. If the mechanism was set for addition as shown in the drawings, this operation of the correction key would bring the high part or point of the V cam 92 into engagement with the pin 91 and set the cross footer for subtraction. If, on the other hand, said pin had already been in the high part of the V cam, due to the depression of the roller 102, then an operation of the correction key would bring the right-hand low part of the cam into engagement with the pin, depressing the latter to the add position. If the roller 102 had been in its intermediate position, bringing the pin 91 into about the middle of the left-hand branch of the slot 92 and so setting the cross footer for disconnect, then the operation of the correction key would bring said pin into about the middle of the right-hand branch of the slot where the cross footer would still be set for disconnect.

A frame piece 106 of sheet metal is secured to the rear side of the casting 5 by two screws at 107. This frame piece or bar has in it a horizontal slot 108 (Fig. 3) into which the pin or stud 58 for the lever 93 projects. As this stud is screwed tight into the rod 56 the guiding of its forward end in the slot 108 prevents said rod from turning and furnishes a correct support for said lever 93. As the rod is thus held from turning a proper support is also furnished by the other stud pin 58 for the floating lever 52.

From all that has been said it will be apparent that the kinematics of this train of gear shifting mechanism is substantially as it was before, the only change residing in the fact that now the floating levers 52 and 93 are supported against up and down movement at their middles instead of at their upper ends, as heretofore.

In order to provide adjustable stop means to limit the sliding motion of the reversing bar 56, a stop arm 110 is mounted on this bar. In the present instance this arm consists of a piece of steel with what amounts to a split hub which is bound to the bar by means of a clamp screw 111. This enables the arm to be adjusted on the bar both length-wise of the bar and also around the bar with perfect ease and to be securely fastened in place in its adjusted position. The arm 110 at its upper end stands a short distance in front of the frame bar 106 and is adapted to vibrate between two adjustable stops 112. These may of course be of any suitable construction but the form shown in the drawings is very convenient and effective. Each consists of a turnable device here shown as a bolt 114 (Fig. 3) having a flat head 115 from which the stop 112 projects as a round continuation of the screw 114 but eccentrically located on the head 115. This stud or stop is made with a screw driver slot. The bolt 114 projects through a hole 116 in the bar 106 behind which it is equipped with a washer 117 and nut 118.

The nuts 118 are screwed down and preferably they are secured by riveting or spinning up the ends of the bolts. This makes enough friction to ensure that the bolts will not jar out of the positions to which they are adjusted, but not enough to prevent their adjustment by means of a screw driver.

The links 62 and 96 have their motions in both directions limited by stops 113 constructed and made adjustable in exactly the same way as the stops 112. Each of said links is made of a broad piece of sheet metal with a rectangular cut-out 120 and the stops 113 project through said cut-outs and are adapted to be struck by the end walls of said cut-out, as will be understood from Fig. 1. It will be perceived that the normal and operated positions of each of these links can be regulated very quickly and very satisfactorily by means of these stops. As the extent of motion required of the link 62 or 96 is substantially uniform, one stop 113 might suffice, the slot 120 being made of a length equal to the required motion of the link plus the diameter of the stop. I prefer, however, to use two stops as shown.

The link 62 is made in all respects the same as the link 96, and the latter only is shown in perspective in Fig. 3. They have the pivot studs 61, 63, 95 and 97. These may be attached either to the links or to the levers. They are here shown projecting rearward from the links into which they are riveted. As will be apparent from Fig. 2, and especially from the showing therein of the link 96, said links 62 and 96 each substantially bear at their forward surfaces against the enlarged heads 115 of the stop members 113 so that said links cannot move toward the front of the machine. The forward face of the link 96 at one end bears against the rear side of the lever arm 98 and it therefore cannot move rearward. The other end of the link bears against the rear face of the floating lever 93, which in turn is prevented from moving rearward by the bar 56, the lower end of said link resting against the rear face of the arm 88. It will be preceived, therefore, that the construction is such that one part of the mechanism holds another part in place so that no special devices are required for this purpose. It will be perceived that the link 62 is likewise kept in place by the heads 115 on the one hand and the levers 52 and 64 on the other. In Fig. 2 the link 96 is drawn in actual contact with the levers 93 and 98 on the one hand, and with heads 115 on the other, but in practice the space allowed is appreciably wider than the thickness of the link 96 so that the parts are very loose so as not to produce any friction. At the same time all of the pivotal connections are exact and the movements are transmiited with precision.

The whole thing can be disassembled in the matter of a few seconds by merely removing the two screws 57 and loosening the clamp screw 111, whereupon the bar 56 can be slid lengthwise of its bearings on the lugs 54 and 55. When that is done, the floating levers 93 and 52 can be simply lifted off of the machine. As the constraint on links 96 and 62 is thereby removed at one end, these links can readily be disconnected from their respective levers 98 and 64 by mere manipulation. The mechanism can be re-assembled as quickly as it was disassembled except that a little care must be exercised in locating the stop arm 110 properly before tightening the screw 111. It will be perceived that all of this mechanism is very sturdy and is so arranged as to be very free in its operation and yet it is exceedingly easy to adjust it, to assemble it and to disassemble it.

The connections from the arm 88 on to the lower reversing rod or shaft 22 in the cross actuator have been improved in their mechanical construction without making any substantial change in the kinematics or mode of operation of the mechanism.

The arm 86 is constructed as heretofore with a cross slot 121 in its hub, said slot being made with inclined edges and the shaft 87 near its forward end has been flattened off on a corresponding incline 122, the extreme front end of the shaft being cylindrical and of reduced diameter to pass into the axial hole in the hub of the arm 86. This hub is thrust on to the end of the shaft and secured in place by a screw 123 as heretofore. The arm 88 on the rear end of this shaft, however, is made with the split hub construction and provided with a clamping screw 90 so that this arm can be exactly adjusted and rigidly secured in place by tightening said screw. The link 84 is connected with the arm 86 by a pivot 85 of ordinary construction consisting of a shouldered and headed rivet. At its outer end this link is pivoted to the lever 83 by a shouldered and headed rivet 125 and open ended slot 126, the rivet in the present instance being fastened to the end of the link and the slot being in the lever. In order to prevent the pivot 125 from coming out of the slot 126 by the link swinging upward about the pivot 85, said link is made about its middle with an elongated slot 127. A screw 128 having its free end reduced into a cylindrical pin or stud is screwed through the castings 5 from the rear, as shown in Fig. 2, the pinlike end of this screw entering the slot 127 and allowing the link to have its necessary endwise motion but preventing it from being lifted out of its notch 126. This link 84 passes through and is guided by a notch in the frame plate 9, as will be apparent from a comparison of Figs. 1 and 2.

The lever 83 is formed near its middle part with an elongated slot 130 through which a headless stud 131 passes and serves as a pivot for the lever. This stud projects from the flattened rear face of a post 132 riveted into and projecting from the frame plate 9. In addition to being flattened to accommodate the lever 83, this post is shown made with a notch 133 to prevent interference with the arm 35 of the universal rock shaft 34. The pin 131 normally occupies the upper end of the slot 130, as shown in Fig. 1.

At its lower end the lever 83 extends into a slot 134, Fig. 3, sawed diametrically and longitudinally into the end of the shaft 22. Said shaft has a cross pin 135 passing through said slot and the lower end of the lever is made with an open-ended slot 136 adapted to embrace said pin 135.

It will be perceived that when the parts are assembled as shown in Figs. 1 and 2, the lower end of the lever 83 cannot move front or back on account of its being inserted in the slot 134. The middle of the lever cannot move forward on account of the post 132, and the upper end of the lever cannot move rearward on account of the head of the pivot 125. The lever therefore cannot get off of the pivot 131. If, however, the screw 128 be removed, then the link 84 can be swung upward out of engagement with the lever 83, whereupon said lever can be lifted vertically, this being permitted by the slot 130 until its lower end is out of the slot 134 and the lever can be lifted out of the machine. The frame post 15 prevents rearward motion of lever 83 sufficient to remove it from its pivot 131. It will be perceived that the taking of this train of mechanism apart is the work of a few seconds and putting it back together again can be done with equal facility. At the same time when it is assembled it works freely and accurately.

Various changes may be made in the details of construction and arrangement without departing from my invention.

What I claim as new and desire to secure by Letters Patent, is:—

1. In the gear-shift mechanism of a computing machine, the combination of a shifter bar, a floating lever the middle of which lies against said bar, a device operated by one arm of said lever, a link for operating another arm of said lever, three studs each projecting from one part and insertable endwise into a hole in another part, one stud connecting said lever with said shifter bar, one with said operated part, and one with said link, said operated part and said link lying on the side of said lever opposite to said shifter bar; and a part acting to prevent said link from moving away from said lever; whereby said shifter bar serves to prevent displacement of said lever from its pivot and the lever serves to prevent displacement of said link from its pivot.

2. In the gear-shift mechanism of a computing machine, including the combination of a shifting lever 64, a link 62, a floating lever 52, a shifter bar 56, and an operated part 48, the arrangement according to which said link is pivoted to the levers 64 and 52 on studs and is prevented by a fixed part from falling away from said levers; and said floating lever is prevented by said shifter bar from falling away from said link 62 and part 48; and said shifter bar is detachable so that the assembly of shifter bar, floating lever and link may be disassembled by first removing the shifter bar.

3. In the gear-shift mechanism of a computing machine, the combination with two pivoted parts and a link connecting said parts, of one or more pieces rotatably adjustable and projecting through an opening in said link said adjustable pieces standing in the path of said link and thus serving as adjustable stops for said link and having parts thereof in position to prevent said link from falling away from said pivoted parts.

4. In the gear-shift mechanism of a computing machine, the combination of a rod to be shifted lengthwise, a lever 83 having a slotted end engaging a pivot in the slotted end of said rod, said lever pivoted on a stud, a link engaging the opposite end of said lever by pin-and-open-slot connection, a device by which said link is operated, and a second stud engaging a longitudinal slot in said link to guide it, the construction being such that by merely removing said second stud the link and lever will be freed so that they can be removed.

Signed at the borough of Manhattan, city of New York, in the county of New York and State of New York, this 30th day of December A. D. 1926.

FREDERICK A. HART.